United States Patent
Szuba et al.

(10) Patent No.: US 12,100,214 B2
(45) Date of Patent: Sep. 24, 2024

(54) VIDEO-BASED PUBLIC SAFETY INCIDENT PREDICTION SYSTEM AND METHOD THEREFOR

(71) Applicant: MOTOROLA SOLUTIONS, INC., Chicago, IL (US)

(72) Inventors: Janusz Szuba, Mylenice (PL); Krzysztof Jasinski, Cracow (PL); Piotr Matejanka, Cracow (PL); Pawel Wilkosz, Wisniowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 379 days.

(21) Appl. No.: 17/661,919

(22) Filed: May 4, 2022

(65) Prior Publication Data

US 2023/0360402 A1 Nov. 9, 2023

(51) Int. Cl.
*G06V 20/52* (2022.01)
*G06V 10/774* (2022.01)

(52) U.S. Cl.
CPC .......... *G06V 20/52* (2022.01); *G06V 10/7747* (2022.01)

(58) Field of Classification Search
CPC ............................ G06V 20/52; G06V 10/7747
See application file for complete search history.

(56) References Cited

U.S. PATENT DOCUMENTS

| | | | |
|---|---|---|---|
| 8,020,104 B2 | 9/2011 | Robarts et al. | |
| 9,582,781 B1 | 2/2017 | Kearns et al. | |
| 10,867,219 B2 | 12/2020 | Koskan et al. | |
| 2010/0231714 A1* | 9/2010 | Flores | H04M 11/04 382/209 |
| 2012/0256745 A1* | 10/2012 | Piett | G06Q 30/02 340/540 |
| 2014/0118543 A1 | 5/2014 | Kerbs et al. | |
| 2017/0161614 A1* | 6/2017 | Mehta | G06N 20/00 |
| 2018/0012078 A1* | 1/2018 | Pournaghi | G06T 7/77 |
| 2018/0053401 A1* | 2/2018 | Martin | H04M 11/04 |
| 2018/0253814 A1* | 9/2018 | Kaguma | G06Q 50/265 |
| 2019/0197369 A1* | 6/2019 | Law | G06N 3/082 |
| 2020/0089965 A1* | 3/2020 | Hollander | G06V 20/41 |
| 2021/0124741 A1* | 4/2021 | Acharya | G06Q 50/26 |

(Continued)

FOREIGN PATENT DOCUMENTS

WO 2018046743 A1 3/2018

*Primary Examiner* — Iriana Cruz

(57) ABSTRACT

A method and system for improving prediction of an incident affecting public safety is described. At a machine learning analytics system, the method includes obtaining a real-time video for a location of a public safety emergency call and predicting a public safety incident therefrom. At a learning processor, the method includes: receiving information related to the public safety emergency call; identifying a public safety incident type based thereon; receiving the prediction of the public safety incident; using a first public safety incident machine learning model based on the identified public safety incident type and comparing the public safety incident prediction with the information related to the public safety emergency call and identifying an incident prediction mismatch therefrom. The learning processor identifies an artifact in the real-time video that is a contributing factor for the incident prediction mismatch; and implements a model improvement action associated with the artifact.

20 Claims, 8 Drawing Sheets

(56) References Cited

U.S. PATENT DOCUMENTS

| | | | |
|---|---|---|---|
| 2021/0158207 A1* | 5/2021 | Alsahlawi | G06N 5/04 |
| 2021/0166034 A1* | 6/2021 | Petersson | G06V 40/19 |
| 2022/0076022 A1* | 3/2022 | Khadloya | G06V 20/46 |
| 2024/0171956 A1* | 5/2024 | Rohde | G06F 40/42 |

* cited by examiner

VIDEO-BASED PUBLIC SAFETY INCIDENT PREDICTION SYSTEM AND METHOD THEREFOR

BACKGROUND OF THE INVENTION

In recent years, in public safety systems, analytical systems have been employed to perform predictions of events and incidents related to public safety. Some of these analytical systems use machine learning for the predictions, which may be based on videos taken by public safety monitoring cameras. In addition, some of these analytical systems use machine learning in order to implement visual object classification, also referred to as 'object recognition', where the classification relates to visual representations of real-life objects found in still images or motion videos that are captured by a camera. By performing visual object classification, each visual object found in the still images or motion video is classified according to its type (such as, for example, human, vehicle, or animal).

In a typical surveillance system, one may be interested in detecting objects, such as humans, vehicles, animals, etc., that move through the environment. However, if for example a child is lost in a large shopping mall, it could be very time consuming for security personnel to manually review video footage for the lost child. Computer-implemented detection of objects in the images represented by the image data captured by the cameras can significantly ease the task of reviewing relevant video segments by the security personnel in order to find the lost child in a timely manner.

Automated security and surveillance systems typically employ video cameras or other image capturing devices or sensors in order to collect image data, such as video footage. In the simplest analytical systems, images represented by the image data are displayed for contemporaneous screening by security personnel and/or recorded for later review, say after a security breach. In those systems, the task of detecting and classifying visual objects of interest is performed by a human observer. A significant advance occurs when the system itself is configured to be able to perform object detection and classification by itself, either partly or completely.

That being said, computer-implemented analysis of video to detect and recognize objects and particularly identify those objects that are similar requires substantial computing resources, especially as the desired accuracy of the identification increases.

The inventors of the present invention have identified that some analytical systems are significantly worse than other systems in discovering objects or predicting incidents for some scenarios or for certain types of data or video footage. It has also proven to be very difficult to identify why some analytical systems struggle to detect, in an automatic, intelligent manner, the reason why the prediction success rate is significantly lower for a particular type of object or incident prediction or for certain types of data or video footage, etc.

Accordingly, there is a need for an improved video-based prediction of an incident affecting public safety and method therefor.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
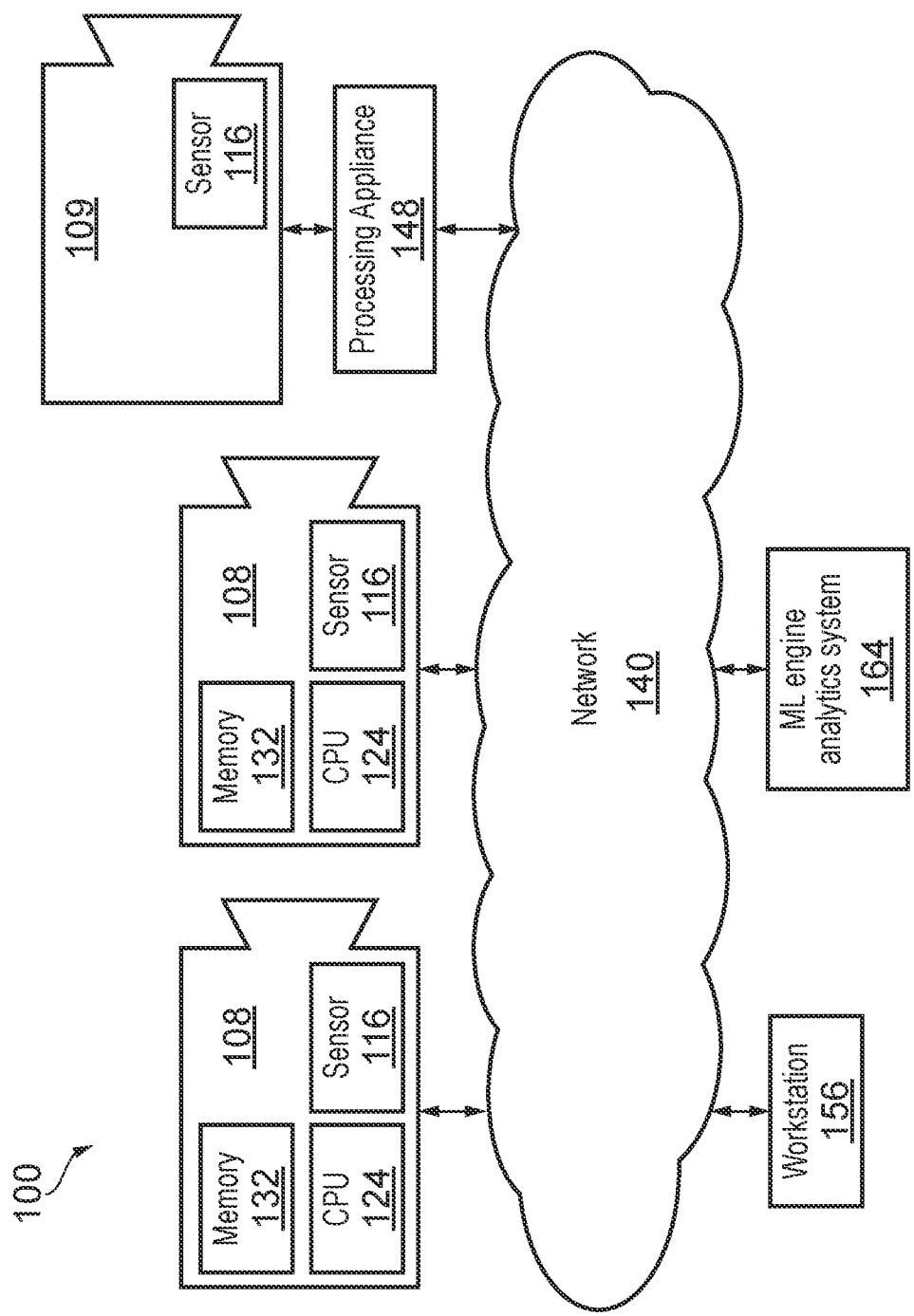
FIG. 1 illustrates a block diagram of connected devices of a video capture and playback system, adapted according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Examples of the invention provide an improved video-based prediction of an incident affecting public safety and method therefor, through provision of a machine learning analytics system that is configured to obtain a real-time video for a location of a public safety emergency call and predicting a public safety incident therefrom. A learning processor, operably coupled to the machine learning analytics system, is configured to receive information related to the public safety emergency call; identify a public safety incident type based on the received information; receive the prediction of the public safety incident from the machine learning analytics system; and, using a first public safety incident machine learning model, and based on the identified public safety incident type, the learning processor compares the public safety incident prediction with the information related to the public safety emergency call. In response to identifying an incident prediction mismatch therefrom; the learning processor identifies an artifact in the real-time video that is a contributing factor for the incident prediction mismatch; and implement a public safety model improvement action associated with the artifact that is identified as the contributing factor for the incident prediction mismatch.

In this manner, the introduction of a learning processor provides an ability to automatically analyze the public safety incident prediction and determine whether (or not) the prediction of the public safety incident was accurate, in light of the emergency call information that is also routed to the learning processor. Moreover, the learning processor is configured to analyze the public safety incident prediction and the emergency call information in order to identify an artifact in the emergency call (or a problem with the video-based prediction), where the artifact relates to, for example, not recognizing a criminal or criminal activity due to a wearing of masks or a weapon type.

Thus, the introduction of a learning processor provides an ability to detect misclassification of events/objects/behaviors based on a determined public safety incident type and a determination/correlation of one or more artifacts, i.e., contributing factors to a prediction mismatch, associated with the particular incident type.

In some examples, the learning processor may be a 'bot' or other intelligent program that is arranged to consider and review labels or relationships between labels in video footage, information from 911 cases related to such video labels, etc.

In some examples, the identification of one or more artifacts that are determined as potentially causing a low-success prediction rate for a given video-based public safety ML model may be improved by implementing a public safety model improvement action associated with the artifact, such as re-training the ML (prediction) model with better data related to the artifact.

In some examples, following an implementation of a model improvement action, the learning processor may be configured to re-assess the prediction and the emergency call information to confirm that the adopted model improvement action has improved the prediction.

In accordance with some examples, the improved automated video-based public safety incident prediction system includes an example of a video management system 100 that obtains or captures real-time video footage for the ML Engine analytics system to use Referring now to FIG. 1, there is illustrated is a block diagram of connected devices of a video management system 100 according to an example embodiment. For example, the video management system 100 may be a video surveillance system. The video management system 100 includes hardware and software that perform the processes and functions described herein. In accordance with examples of the invention, a ML engine analytics system may obtain a real-time video for a location of a public safety emergency call from the video management system 100 and predict a public safety incident therefrom.

The video management system 100 includes at least one video capture device 108 being operable to capture a plurality of images and produce image data representing the plurality of captured images, with two devices shown for explanatory purposes only. The video capture device (e.g., camera) 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a complementary metal-oxide-semiconductor (CMOS)-based device, Negative-channel Metal-Oxide Semiconductor (NMOS)-based device, or charge coupled device (CCD). In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal feature is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, smartphone or controller.

Each video capture device 108 includes one or more processors 124, one or more memory devices 132 coupled to the processors and one or more network interfaces. The memory device 132 can include a local memory (such as, for example, a random access memory and a cache memory) employed during execution of program instructions. The processor 124 executes computer program instructions (such as, for example, an operating system and/or application programs), which can be stored in the memory device 132.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally, or alternatively, such processing circuits may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor 124 is operable to store data and computer program instructions. Typically, the memory device 132 is all or part of a digital electronic integrated circuit or formed from a plurality of digital electronic integrated circuits. The memory device 132 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 132 may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 132 and the network interface may be implemented within a SOC. Furthermore, when implemented in this way, a general-purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network 140.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video management system 100 includes a processing appliance 148. The processing appliance 148 is operable to process the image data output by a video capture device, such as video capture device 109. The processing appliance 148 also includes one or more processors and one or more memory devices coupled to a processor (CPU). The processing appliance 148 may also include one or more network interfaces, with only one processing appliance shown for clarity purposes only. For convenience of illustration, only one processing appliance 148 is shown; however, it will be understood that the video management system 100 may include any suitable number of processing appliances 148.

For example, and as illustrated, the processing appliance 148 is connected to a video capture device 109 which may not have memory 132 or CPU 124 to process image data. The processing appliance 148 may be further connected to the network 140.

According to one exemplary embodiment, and as illustrated in FIG. 1, the video management system 100 includes at least one workstation 156 (such as, for example, a server), each having one or more processors including graphics processing units (GPUs). The at least one workstation 156 may also include storage memory. The workstation 156 receives image data from at least one video capture device 108 (or alternatively video capture device 109) and performs processing of the image data. The workstation 156 may further send commands for managing and/or controlling one or more of the image capture devices 108, 109. The workstation 156 may receive raw image data from the video capture device 108, 109. Alternatively, or additionally, the workstation 156 may receive image data that has already undergone some intermediate processing, such as processing at the video capture device 108, 109 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video management system 100 further includes at least one client device, which in this example is the ML engine analytics system 164 that is connected to the network 140. The ML engine analytics system 164 is used by one or more users to interact with the video management system 100. Accordingly, the ML engine analytics system 164 includes at least one display device and at least one user input device (such as, for example, a mouse, keyboard, or touchscreen). The ML engine analytics system 164 is operable to display on its display device a user interface for displaying information, receiving user input, and playing back video. For example, the client device may be any one of a personal computer, laptop, tablet, cell phone, smart phone, and other mobile device.

The ML engine analytics system 164 is operable to receive image data over the network 140 and is further operable to playback the received image data. A ML engine analytics system 164 may also have functionalities for processing image data. For example, processing functions of a ML engine analytics system 164 may be limited to processing related to the ability to playback the received image data. In other examples, image processing functionalities may be shared between the workstation 156 and the ML engine analytics system 164.

In some examples, the video management system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and the ML engine analytics system 164.

Figure 2:
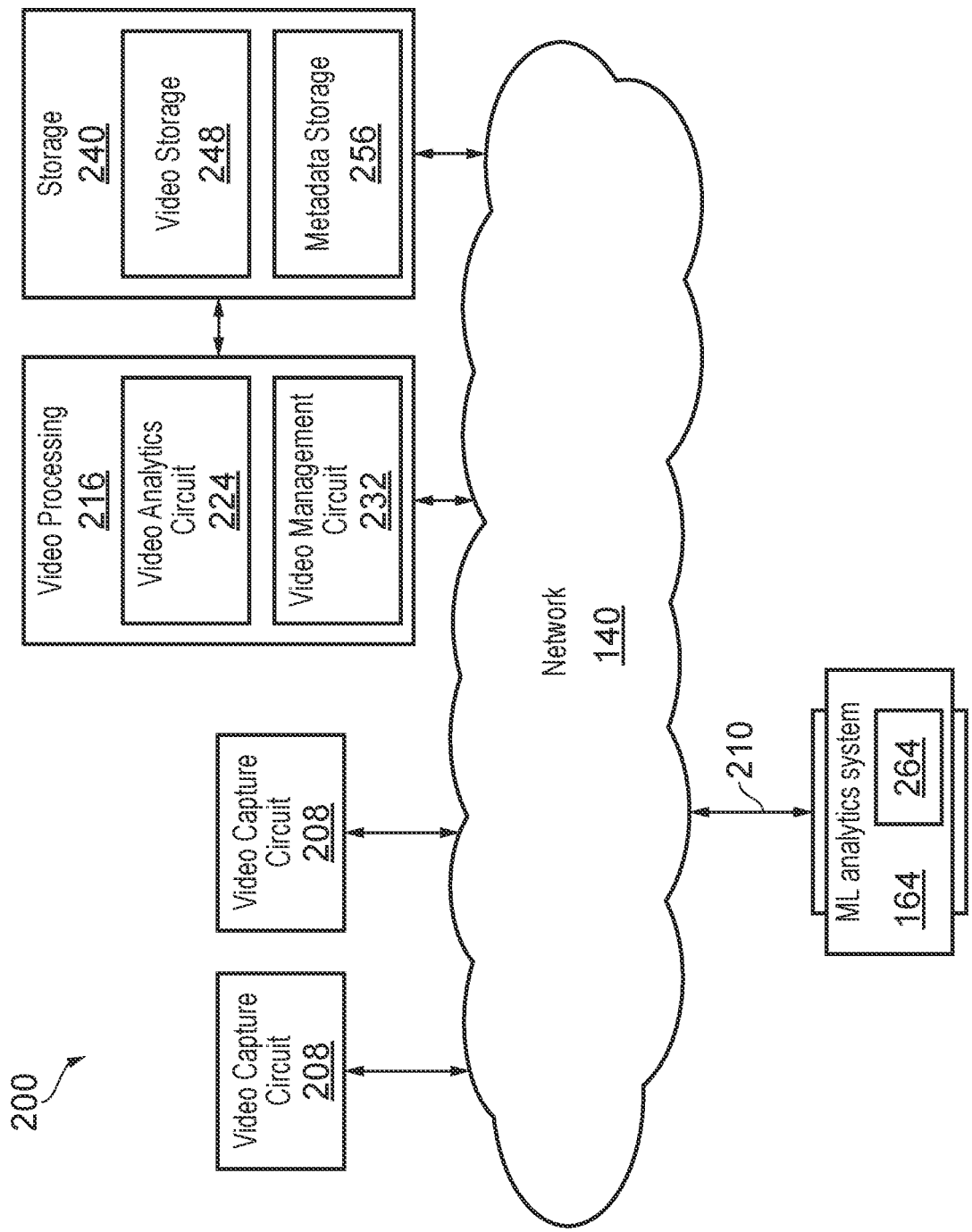
FIG. 2 illustrates a block diagram of a set of operational circuits of the video capture and playback system, adapted according to one example embodiment.

Referring now to FIG. 2, therein illustrated is a block diagram of a set 200 of operational circuits of the video management system 100 according to one example embodiment. The operational circuits may be implemented in hardware, software or both on one or more of the devices of the video management system 100 as illustrated in FIG. 1.

The set 200 of operational circuits include at least one video capture circuit 208. For example, each video capture device 108 may implement a video capture circuit 208. The video capture circuit 208 is operable to control one or more components (such as, for example, sensor 116) of a video capture device 108 to capture images. The set 200 of operational circuits includes a subset 216 of image data processing circuits. For example, and as illustrated, the subset 216 of image data processing circuits includes a video analytics circuit 224 and a video management circuit 232. It will be understood that according to some example embodiments, the subset 216 of video processing circuits may include only one of the video analytics circuit 224.

The video management circuit 232 receives image data and performs processing functions on the image data related to video transmission, playback and/or storage. For example, the video management circuit 232 can process the image data to permit transmission of the image data according to bandwidth requirements and/or capacity. The video management circuit 232 may also process the image data according to playback capabilities of a ML engine analytics system 164 that will be playing back the video, such as processing power and/or resolution of the display of the ML engine analytics system 164. The video management circuit 232 may also process the image data according to storage capacity within the video management system 100 for storing image data.

The set 200 of operational circuits further include a subset 240 of storage. For example, and as illustrated, the subset 240 of storage includes a video storage 248 and a metadata storage 256. The video storage 248 stores image data, which may be image data processed by the video management circuit. The metadata storage 256 stores information data output from the video analytics circuit 224.

The video analytics circuit 224 receives image data and analyzes the image data to determine properties or characteristics of the captured image or video and/or of objects found in the public safety incident scene represented by the image or video. Based on the determinations made, the video analytics circuit 224 may further output metadata providing information about the determinations. Examples of determinations made by the video analytics circuit 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics circuit 224.

In accordance with examples of the invention, the ML analytics system 164 is configured to obtain/receive real-time (or stored) video footage from one or more of the video capture circuits 208, video processing 216 or subset 240 of storage. The ML engine analytics system 164 comprises a prediction circuit 264, typically in a form of a machine language (ML)-based processor/circuit, that is configured to predict a future event or incident related to public safety based on the obtained video footage. In some examples, the prediction will be based on the determined properties or characteristics of the captured image or video and/or of objects found in the public safety incident scene represented by the image or video.

It will be understood that while video storage 248 and metadata storage 256 are illustrated as separate circuits, they may be implemented within a same hardware storage whereby logical rules are implemented to separate stored video from stored metadata. In other example embodiments, the video storage 248 and/or the metadata storage 256 may be implemented using hardware storage using a distributed storage scheme. The ML engine analytics system 164 may comprise a video playback circuit configured to receive image data and playback the image data as a video.

The operational circuits of the set 200 may be implemented on one or more of the image capture device(s) 108, processing appliance 148, workstation 156 and ML engine analytics system 164 of FIG. 1. In some example embodiments, an operational circuit may be wholly implemented on a single device. For example, video analytics circuit 224 may be wholly implemented on the workstation 156. Similarly, video management circuit 232 may be wholly implemented on the workstation 156.

In other example embodiments, some functionalities of an operational circuit of the set 200 may be partly implemented on a first device while other functionalities of an operational circuit may be implemented on a second device. For example, video analytics functionalities may be split between one or more of an image capture device(s) 108, processing appliance 148 and workstation 156. Similarly, video management functionalities may be split between one or more of an image capture device(s) 108, processing appliance 148 and workstation 156.

Figure 3:
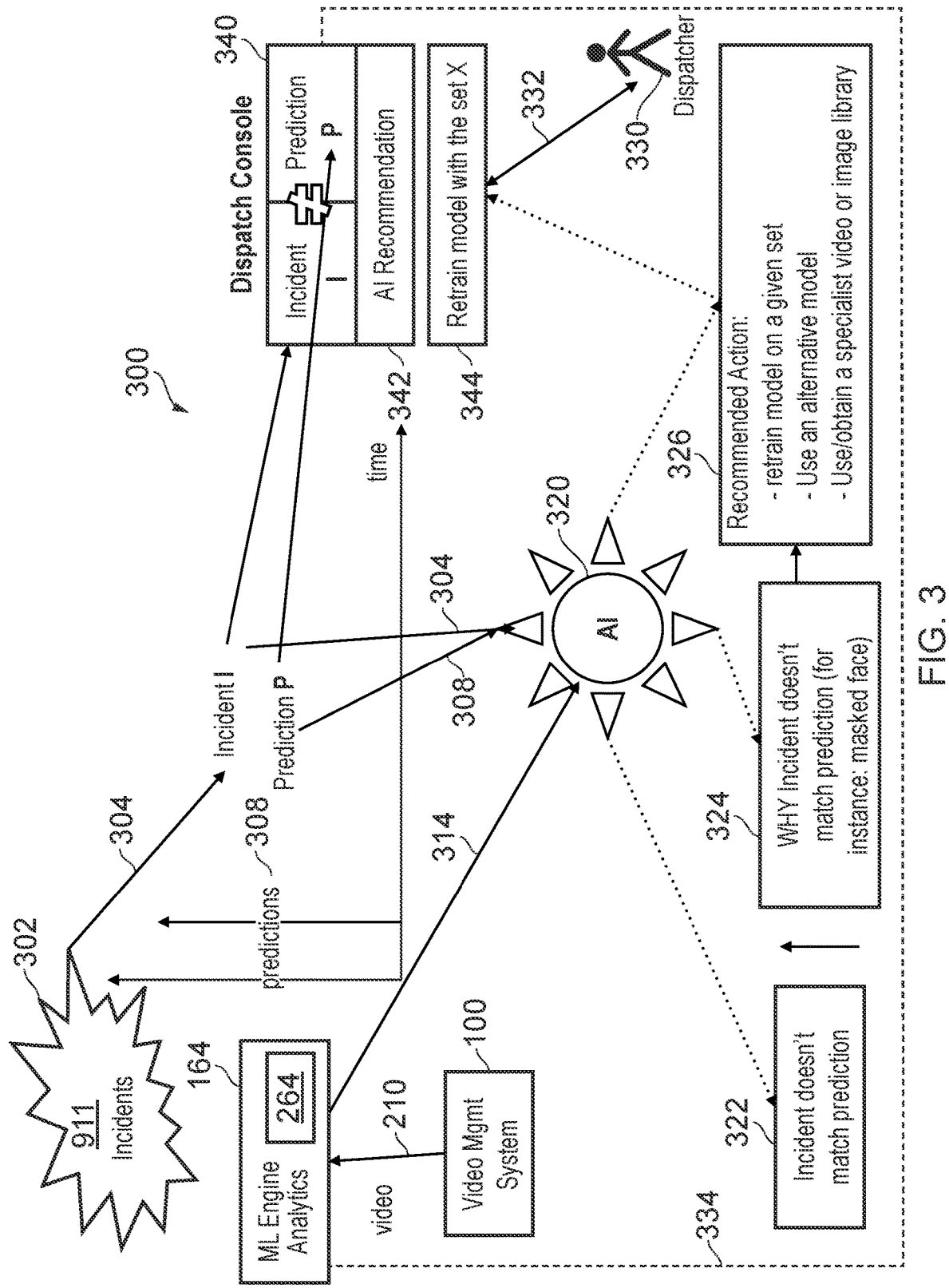
FIG. 3 is a block diagram of an improved automated video-based public safety incident prediction system, adapted according to some example embodiments.

Referring now to FIG. 3, a block diagram of an improved automated video-based public safety incident prediction system 300 is shown, according to some example embodiments. FIG. 3 shows a public safety emergency call, identified as a 911 incident call 302, which is routed 304 to a dispatch console 340. The 911 incident call 302 may comprise video footage and/or at least one of: a verbal description of an incident in the emergency call, and a voice recording.

Substantially concurrently, in this example, a video management system 100 is providing real-time video 210 associated with the 911 incident call 302 to a machine learning (ML) analytics system 164. The provision of the real-time video 210 may be requested by the ML engine analytics system 164 or instigated by the dispatch console 340 or dispatcher 330. For example, the ML engine analytics system 164 may select which real-time video 210, say, from available video cameras in the system of FIG. 1 or FIG. 2, may be associated with the 911 incident call 302 and obtain and use the video footage. Based on the obtained real-time video 210, the prediction circuit 264 in the ML engine analytics system 164 performs one or more incident prediction(s) 308 and provides the one or more incident prediction(s) 308 to the dispatch console 340 and dispatcher 330. The one or more incident prediction(s) 308 are based on videos, for instance: predicting an area where a crime incident may be going to happen in the next few minutes/hours, or predict any further criminal activity.

In some examples of the invention, the Learning Processor 320 may form a part of the prediction circuit 264 or a separate part of the ML engine analytics system 164. In this context, for example, when a retrained public safety model is made available the ML engine analytics system may be configured to use this retrained public safety model to make new predictions. ML retraining is known. An example of ML retraining and how to use a retrained model is described in: 'A guide on when to retrain your Machine Learning model—And learn more about retraining strategies'. Retraining is usually performed by replacing faulty data in the training set, and running the learning process again. However, more sophisticated methods with a division of a bigger model to smaller models, and retraining only the selected smaller models, are also possible and may be used in examples herein described.

In some examples, the one or more incident prediction(s) 308 passed to the dispatch console 340 and dispatcher 330 may include an indication that an incident prediction was not possible. Herein, reference to one or more incident prediction(s) 308 encompasses such an inability to predict following an attempt to predict, and thus includes such an indication of non-prediction.

In the improved automated video-based public safety incident prediction system 300, a learning processor 320, such as processing appliance 148 in FIG. 1 or video processing device 216 in FIG. 2 (or a system bot or other intelligent program), is configured to receive and process the information related to the 911 incident call 302 routed 304 to the dispatch console 340 and the one or more incident prediction(s) 308 routed to the dispatch console 340. In some examples, the processing of the received data by learning processor 320 may be performed concurrently with the 911 incident call 302. In some examples, the processing of the received data by learning processor 320 may be performed subsequent to the 911 incident call 302, e.g., off-line.

The learning processor 320 is configured to improve a prediction of an incident affecting public safety, performed by the ML engine analytics system 164, using machine learning models and public safety videos, which, inter alia, encompasses determining whether (or not) the incident being reported in the 911 incident call 302 (or events occurring subsequent to the incident being reported in the 911 incident call 302) matches the one or more prediction(s) 308 provided by the ML engine analytics system 164. In this manner, the learning processor 320 compares the public safety incident prediction with the information related to the public safety emergency call and identifies whether (or not) there is an incident prediction mismatch therefrom.

If the learning processor 320 identifies that the incident being reported in the 911 incident call 302 does not match the one or more prediction(s) 308 provided by the ML engine analytics system 164 at 322, the learning processor is configured to investigate this anomaly and determine one or more reasons, at 324, as to why the incident being reported in the 911 incident call 302 does not match the one or more prediction(s) 308. In this example, the learning processor 320 is configured to check (one or more, say, real-time) videos for which the prediction accuracy is significantly lower than average and implements a public safety model improvement action 342 to address the anomaly.

The learning processor 320 analyzes the videos received 314 from the ML engine analytics system 164 (or in other examples the video management system 100) and in some examples may identify one or more real-time video(s) for a location of the public safety emergency call and predict a public safety incident therefrom. In this regard, the learning processor 320 may consider and check a type of label assigned to the video(s) associated with a video or incident, and/or relationships between the labels, and/or as well as relationships between labels and the 911 incident call 302 and/or other comparable submitted 911 cases, etc. Herein, the reference to 'label' assigned to a video encompasses any description associated with an event, such as highlighting the video contains a masked assailant or knife attack, or such. Hereafter, the terms objects/concepts/labels will be referred to as an artifact, wherein the artifact is associated with a public safety incident type and comprises, for example, public safety incident types of: a masked assailant, a type of weapon used, danger to the public, a known criminal, traffic crash, stolen vehicle, etc.

In this example, the learning processor 320, is configured to identify one or more artifact(s) in the real-time video associated with the incident, as reported in the emergency call, e.g., 911 incident call 302, or the real-time video being monitored and analyzed by the ML engine analytics system 164. In this manner, learning processor 320 is configured to identify one or more artifact(s) in the real-time video that is/are potentially a contributing factor for the prediction mismatch therefrom. In some examples, the artifact that is associated with a public safety incident type may include one or more of: a masked assailant, an existence of an identified weapon, a potential weapon or a type of weapon, a known criminal, etc.

Once the learning processor 320 has discovered the common items that are present in the videos for which prediction accuracy is significantly lower, or the prediction accuracy for types of incidents submitted via 911 is significantly lower, the learning processor 320 is able to identify the one or more artifact(s) that is/are potentially a contributing factor for the incident prediction mismatch therefrom. In some examples, the identifying of an artifact that is a contributing factor for the incident prediction mismatch may include identifying an artifact that is associated with a public safety incident type. For example, the one or more artifact(s) may be, for instance, a face in a mask, or, say, videos from 911 cases in Manhattan, New York, or incidents with knives submitted via 911.

Thereafter, at 326, the learning processor 320 may implement one (or more) of a recommended model improvement action 342 associated with the artifact that is identified as the contributing factor for the incident prediction mismatch. For example, the model improvement action 342 may comprise at least one of: retraining 344 the first public safety incident model using a set of data associated with the information related to the public safety emergency call or the identified artifact from the real-time video; using an alternative second public safety incident model for predicting based on the identified public safety incident type; obtaining a specialist video library for data associated with the information related to the public safety emergency call; obtaining a specialist video (or image) library for data associated with the identified artifact from the real-time video, for example suggesting to use an external specialized library of knifes for training the learning processor 320. In some examples, using an alternative second public safety incident model for predicting based on the identified public safety incident type may include obtaining at least one different public safety video related to the identified artifact from the real-time video for which prediction is low and check labels in the/those videos to determine whether that public safety model would be better to use for the present incident or similar future incidents. Thus, in some examples the public safety model improvement action 342 may implement retraining 344 when it knows that a complementary public safety model is not available in readily available databases or memory. In this manner, an improved public safety ML model may be obtained. Alternatively, the model improvement action 342 may search for a different or specialized public safety model or library when it is knows that such a public safety model or a library exists in readily available databases or memory. In some examples, the selected model improvement action may be informed to or controlled by, the dispatcher 330, at 332.

Finally, in some examples, the learning processor 320 may be configured to check whether the implemented public safety model improvement action 342, associated with the identified artifact from the real-time video that was identified as the contributing factor for the incident prediction mismatch, has worked and improved the accuracy of the prediction(s).

Figure 4:
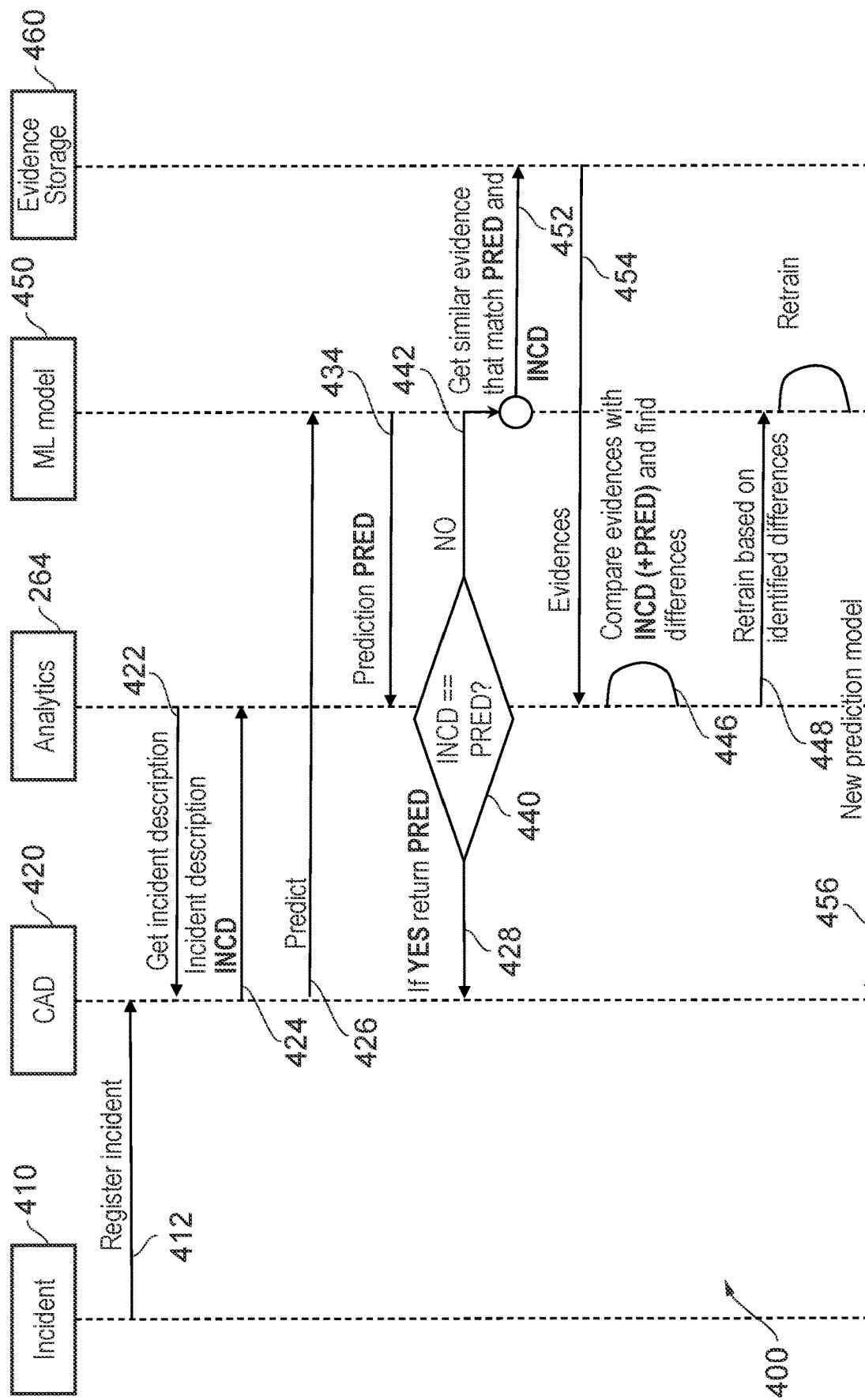
FIG. 4 is a message sequence chart for a method of automated video-based public safety incident prediction, adapted in accordance with some example embodiments.

Referring now to FIG. 4, a message sequence chart (MSC, akin to a flowchart of data flow) 400 for a method of automated video-based public safety incident prediction is illustrated, in accordance with some example embodiments. The MSC 400 shows communications according to one example between an public safety incident 410, for example as made by a 911 caller, a computer-aided dispatch (CAD) system 420 (which are utilized by dispatchers, call-takers, and 911 operators to prioritize and record incident calls, identify the status and location of responders in the field, and effectively dispatch responder personnel), a ML engine analytics system 264, a ML model 450 and an evidence storage repository 460.

The MSC of data flow starts with a public safety incident call, e.g., a 911 call, 412 that is received by the CAD system 420. The dispatcher at the CAD system 420 obtains the details of the registered incident at 412 (often referred to as incident description (INCD)) and passes these details at 424 to the ML engine analytics system 264. In some examples, the ML engine analytics system 264 may be forewarned of the public safety incident call and request the details from the dispatcher at 422. The dispatcher also passes the INCD to the ML model 450, to obtain an event or scenario prediction at 426. The ML model 450 then sends one or more incident predictions at 434 to the ML engine analytics system 264, which determines whether (or not) the one or more public safety incident prediction(s) 434 matches the information related to the public safety emergency call 412.

If the one or more public safety incident prediction(s) 434 matches the information related to the public safety emergency call 412 at 440, then the one or more public safety incident prediction(s) 434 is forwarded to the CAD system 420 (or the dispatcher) at 428.

However, if the one or more public safety incident prediction(s) 434 does not match the information related to the public safety emergency call 412, then the ML engine analytics system 264 informs the ML model 450, at 442. In this instance, the ML model 450 may attempt to obtain similar evidence, e.g., video footage from the evidence storage repository 460, that matches the one or more public safety incident prediction(s) and/or the incident description, at 452. If similar public safety incident prediction(s) and/or incident description is obtainable from evidence storage repository 460, it is returned to the analytics systems 264 at 454. Thereafter, the analytics systems 264 may iteratively compare the obtained similar evidence information with the incident description plus the one or more public safety incident prediction(s) at 446 in order to identify any similarities and differences. At 448, and after successfully identifying a comparison match between the obtained similar evidence information with the incident description plus the one or more public safety incident prediction(s) at 446, the analytics systems 264 may then initiate a re-training operation of the ML model 450 based on the identified differences. Once the ML model 450 has been re-trained, at 456 the new prediction model is transferred to the CAD system 420.

Figure 5:
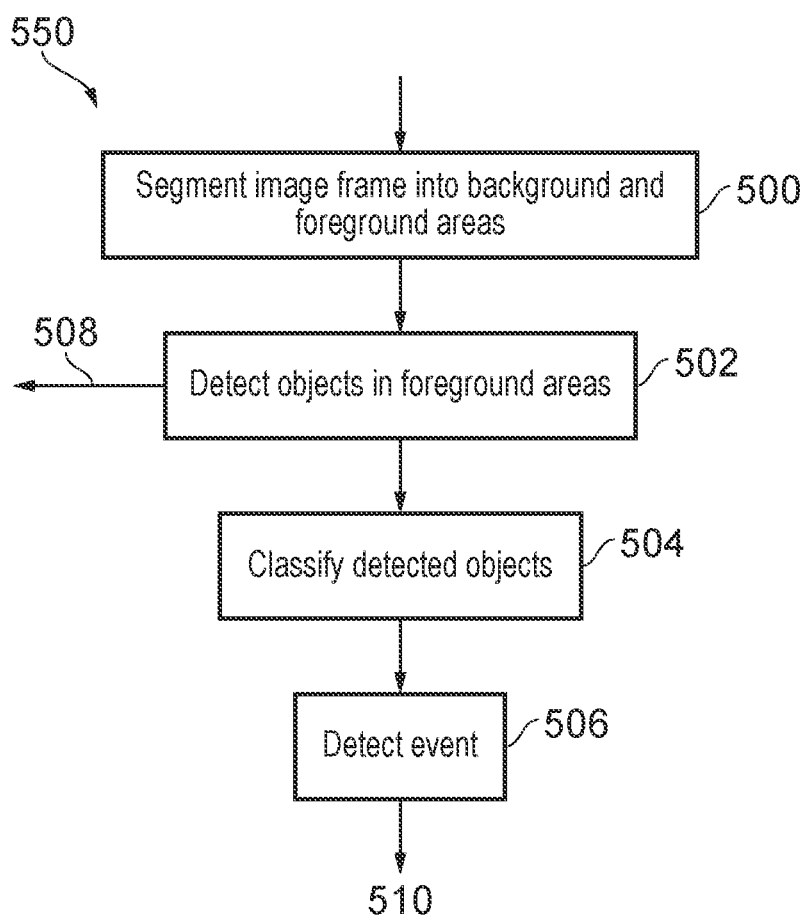
FIG. 5 illustrates a flow diagram of an example embodiment of a method for performing video analytics on one or more image frames of a video captured by a video capture device.

Referring now to FIG. 5, a flow diagram of a method 550 for performing video analytics on one or more image frames of a video captured by, say, video capture device 108 of FIG. 1, is illustrated, according to some example embodiments. In accordance with examples of the invention, learning processor 320 in FIG. 3 is configured to employ, say, the example technique in FIG. 5 to obtain/identify an artifact in the real-time video that is or may be a contributing factor for the incident prediction mismatch.

Thus, the video analytics is performed by the learning processor 320 to determine properties or characteristics of the captured image or video and/or of visual objects/artifacts found in the public safety incident scene captured in the video, for example where the artifact is a masked assailant, a type of weapon, etc.

At 500, at least one image frame of the video is segmented into areas, such as foreground areas and background areas. The segmenting separates areas of the image frame corresponding to moving objects/artifacts (or previously moving objects/artifacts) in the captured public safety incident scene from stationary areas of the public safety incident scene.

At 502, one or more foreground visual objects in the public safety incident scene represented by the image frame is/are detected based on the segmenting of 500. For example, any discrete contiguous foreground area may be identified as a foreground visual object in the public safety incident scene. For example, only contiguous foreground areas greater than a certain size (such as, for example, number of pixels) are identified as a foreground visual object.

Metadata may be further generated relating to the detected one or more foreground areas. The metadata may define the location, reference coordinates, classification, attributes of or events associated with the foreground visual object, or object/artifact, within the image frame, and such metadata may be output separately at 508. For example, the location metadata may be further used to generate a bounding box (such as, for example, when encoding video or playing back video) outlining the detected foreground visual object/artifact. The image within the bounding box is extracted, called a cropped bounding box (also referred to as a "Chip"), for inclusion in metadata, which along with the associated video may be processed further at other devices, such as workstation 156, on the network 140. In short, the cropped bounding box, or Chip, is a cropped portion of an image frame of the video containing the detected foreground visual object/artifact. In examples of the invention, the detected objects in the foreground area(s) is/are then classified at 504. For example, the detected object(s) may be classified as a masked assailant identified in the public safety incident scene, or a type of weapon, etc.

The extracted image, which is the cropped bounding box, alternately may be smaller than what was in the bounding box, or may be larger than what was in the bounding box. The size of the image being extracted, for example, should be close to, but outside of, the actual boundaries of the object that has been detected. The bounding boxes are typically rectangular in shape, but may also be irregular shapes that closely outline the objects. A bounding box may, for example, closely follow the boundaries (outline) of a human object, for example in a context of a masked assailant. In some examples the classified detected object(s) at 504 may lead to a determination of a detected event, at 506. The detected object, and optionally, the detected event, is/are then output at 510. In this manner, video analytics on one or more image frames of a video captured by, say, video capture device 108 of FIG. 1, is performed say by learning processor 320 in FIG. 3 in order to obtain/identify an artifact in a real-time video that is or may be a contributing factor for an incident prediction mismatch of a public safety incident scene.

Figure 6:
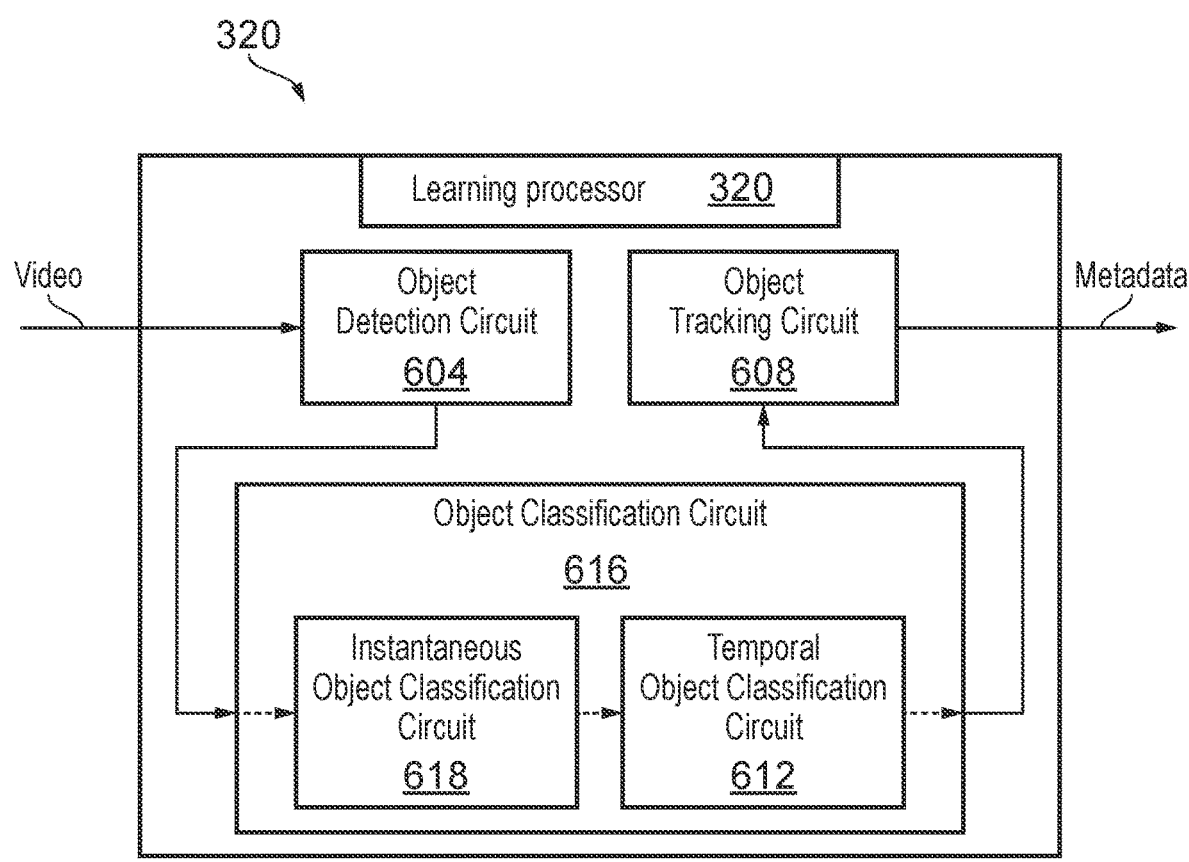
FIG. 6 illustrates a block diagram of a set of operational sub-circuits of the learning processor according to one example embodiment.

Referring now to FIG. 6, a block diagram of a set of operational sub-circuits of an example learning processor 320 is illustrated, according to one example embodiment. In this example, the learning processor 320 includes a number of circuits for performing various tasks. For example, the learning processor 320 includes an object detection circuit 604 for detecting objects appearing in the field of view of a video capturing device, such as the artifacts hereinbefore described. The object detection circuit 604 may employ any known object detection method such as motion detection, for example. Known examples of object detection that can be employed by object detection circuit 604 include, but are not limited to, traditional object detection methods, such as: Violaa-Jones Detector (2001), HOG Detector (2006), DPM (2008), as well as known neural networks, such as: Region-based Convolutional Neural Networks (RCNN) and Spatial Pyramid Pooling in deep convolutional networks (SPPNet 2014), Fast RCNN and Faster RCNN (2015), Mask R-CNN (2017), Pyramid Networks/Feature Pyramid Networks (FPN 2017), G-RCNN (2021), 'you only learn one representation' (YOLOR 2021).

The learning processor 320 also includes an object tracking circuit 608 connected or coupled to the object detection circuit 604. The object tracking circuit 608 is operable to temporally associate instances of an object detected by the object detection circuit 608. The object tracking circuit 608 may include the systems and use the methods described in U.S. Pat. No. 8,224,029 entitled "Object Matching for Tracking, Indexing, and Search," the entire contents of which are incorporated herein by reference. The object tracking circuit 608 generates metadata corresponding to visual objects it tracks. The metadata may correspond to signatures of the visual object representing the object's appearance or other features and may also be processed by the ML engine analytics system 264 in FIG. 1 and FIG. 2.

The learning processor 320 also includes an object classification circuit 616, which classifies detected objects from the object detection circuit 604 and connects to the object tracking circuit 608. The object classification circuit 616 may include internally an instantaneous object classification circuit 618 and a temporal object classification circuit 612. The instantaneous object classification circuit 618 determines a visual object's type (such as, for example, human, vehicle, or animal) based upon a single instance of the object. The input to the instantaneous object classification circuit 616 is preferably a sub-region (for example within a bounding box) of an image in which the visual object of interest is located rather than the entire image frame. A benefit of inputting a subregion of the image frame to the classification circuit 616 is that the whole public safety incident scene need not be analyzed for classification, thereby requiring less processing power. The learning processor 320 may, for example, filter out all object types except human for further processing.

The temporal object classification circuit 612 may also maintain class (such as, for example, human, vehicle, or animal) information of an object over a period of time. The temporal object classification circuit 612 averages the instantaneous class information of the object provided by the instantaneous object classification circuit 618 over a period of time during the lifetime of the object. In other words, the temporal object classification circuit 612 determines the object's type based on its appearance in multiple frames. For example, gait analysis of the way a person walks can be useful to classify a person, or analysis of a person's legs can be useful to classify a cyclist.

The temporal object classification circuit 612 may combine information regarding the trajectory of an object (such as, for example, whether the trajectory is smooth or chaotic, or whether the object is moving or motionless) and confidence information of the classifications made by the instantaneous object classification circuit 618 averaged over multiple frames. For example, classification confidence values determined by the object classification circuit 616 may be adjusted based on the smoothness of trajectory of the object. The temporal object classification circuit 612 may assign an object to an unknown class until the visual object is classified by the instantaneous object classification circuit 618 a sufficient number of times and a predetermined number of statistics have been gathered. In classifying an object, the temporal object classification circuit 612 may also take into account how long the object has been in the field of view. The temporal object classification circuit 612 may make a final determination about the class of an object based on the information described above. The temporal object classification circuit 612 may also use a hysteresis approach for changing the class of an object. More specifically, a threshold may be set for transitioning the classification of an object from unknown to a definite class, and that threshold may be larger than a threshold for the opposite transition (such as, for example, from a human to unknown). The object classification circuit 616 may generate metadata related to the class of an object, and the metadata may be stored in the database. The temporal object classification circuit 612 may aggregate the classifications made by the instantaneous object classification circuit 618.

In a further alternative example, the learning processor 320 may use facial recognition (as is known in the art) to detect faces in the images of humans and accordingly provides confidence levels. The appearance search system of such an example may include using feature vectors of the images or cropped bounding boxes of the faces instead of the whole human. Such facial feature vectors may be used alone or in conjunction with feature vectors of the whole object. Further, feature vectors of parts of objects may similarly be used alone or in conjunction with feature vectors of the whole object.

Figure 7:
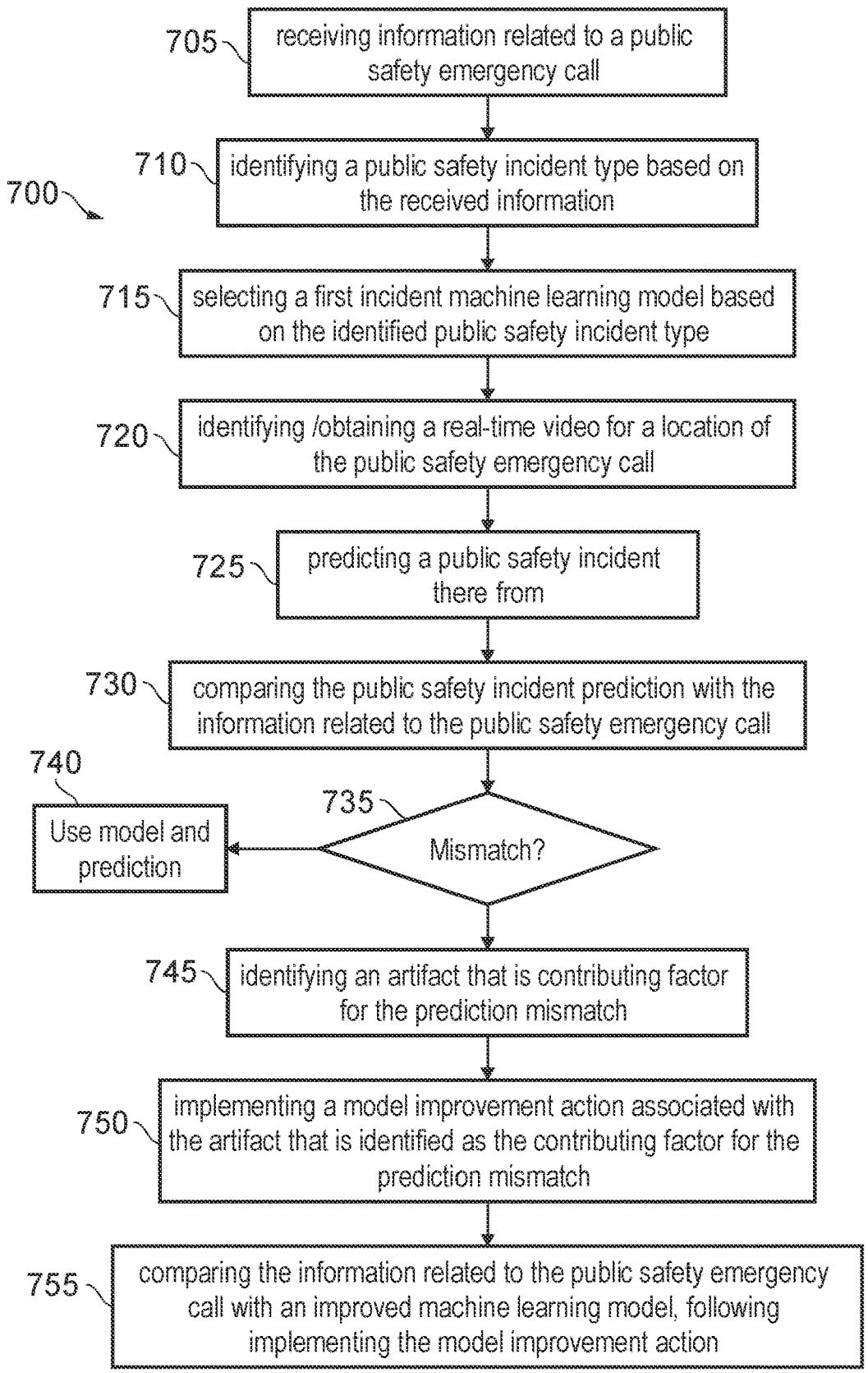
FIG. 7 illustrates a flow diagram of an example embodiment for improved prediction of incidents in public safety systems in accordance with some example embodiments.

Referring now to FIG. 7, a flow diagram 700 of an example embodiment for automatically improving prediction of incidents in public safety systems based on public safety videos is illustrated, in accordance with some example embodiments.

The method comprises, at 705, receiving information related to a public safety emergency call, and, at 710, identifying a public safety incident type based on the received information. At 715, a first public safety incident machine learning model is selected based on the identified public safety incident type. At 720, the method further comprises obtaining a real-time video for a location of the public safety emergency call and, at 725, predicting a public safety incident therefrom. In some examples, the obtaining of a real-time video for a location of the public safety emergency call and predicting a public safety incident therefrom may include the processor checking at least one of, or a relationship between: at least one label or artifact associated with a video or incident.

At 730, the method further comprises comparing the public safety incident prediction with the information related to the public safety emergency call. A determination is made, at 735, as to whether the comparison of the public safety incident prediction with the information related to the public safety emergency call results in a mismatch. If the comparison does not result in a mismatch, at 735, the existing public safety model is used at 740 for the (and similar future) prediction(s).

However, if, at 735, the comparison does result in a mismatch, the method further comprises identifying, at 745, an artifact from a real-time video that is potentially a contributing factor for the incident prediction mismatch. In some examples, the identifying of the artifact from the real-time video that is a contributing factor for the incident prediction mismatch may include identifying the artifact from the real-time video that is associated with a public safety incident type, for example, where the artifact is a masked assailant, a type of weapon, etc.

At 750, the method further comprises implementing a public safety model improvement action associated with the identified artifact from the real-time video that is identified as the contributing factor for the incident prediction mismatch. In some examples, implementing a public safety model improvement action associated with the artifact that is identified as the contributing factor for the incident prediction mismatch at 750 may include at least one of: retraining the first public safety incident model using a set of data associated with the information related to the public safety emergency call, whereby an improved public safety ML model may be obtained; using an alternative second public safety incident model for predicting based on the identified public safety incident type; obtaining a specialist video library for data associated with the information related to the public safety emergency call; and obtaining a specialist video library for data associated with the artifact. In some examples, the using of an alternative second public safety incident model for predicting based on the identified public safety incident type may include obtaining at least one different public safety video related to the artifact for which prediction is low and check labels of those videos.

In some examples, the method may optionally further include, at 755, comparing the information related to the public safety emergency call with an improved public safety machine learning model, following implementing the model improvement action associated with the artifact and identifying whether a second prediction is a better match than the prediction mismatch, in order to confirm that the action followed has improved the accuracy of the predictions.

In order to explain some of the benefits and aspects of the concepts herein described, let us consider some use cases:

Use Case 1: Faces in Masks

In a given area or district of a city, ML Engine Analytics system, such as ML engine analytics system 164 of FIG. 3, is receiving video images from a video management system and is generally able to identify one or more face(s) reasonably accurately (e.g., gender, age, matching the face to a name, etc.). However, in this area, at the time of a sports event, a large number of fans appeared. The fans have hidden, or partially hidden, their faces with scarfs or shawls, headgear, etc. As a result of this sports event, the ML Engine Analytics system achieves a much poorer recognition of faces due to the lower number of features of the face being provided as an input to the ML engine analytics system.

A police officer reports a public safety incident and within that report that a criminal was recognized. The ML Engine Analytics system for face recognition receives information, e.g., a copy of the call or a report related to the public safety emergency call and identifies a public safety incident type based on the received information and using a first public safety incident machine learning model based on the identified public safety incident type.

The ML Engine Analytics system accesses video footage of the area around the incident, to obtain real-time video footage thereof, in order to help the police officer locate the identified criminal. However, the ML engine analytics system for face recognition reports that the criminal cannot be found by the system, or that the criminal can be recognized (or partially recognized) only by selected cameras. Thus, the public safety incident with respect to face recognition for the criminal is unsuccessful. Hence, the ML engine analytics system informs the dispatcher (or police officer) that for that particular scenario, the analytics for this particular case is not useful or appropriate or that the case analytics predicts with a low level of accuracy (e.g., in some cases the criminal may be recognized or partially recognized within, say, a percentage accuracy prediction, or in some other cases not recognized at all.

In accordance with an example, the learning processor (e.g., learning processor 320) obtains and compares the video, the prediction (or lack thereof) and details of the incident and identifies an incident prediction mismatch therefrom. The learning processor then identifies an artifact in the real-time video that is a contributing factor for the incident prediction mismatch, which in this case is the problem of people recognition prediction when there are masked faces. As a consequence, the learning processor implements or recommends a public safety model improvement action associated with the artifact that is identified as the contributing factor for the incident prediction mismatch, which may be one of the following actions:

(a) re-train the current public safety machine learning model with videos having people with masked faces in this district, such that an improved public safety ML model may be obtained;

(b) look for a specialistic external library of masked faces and re-train the public safety model;

(c) look in other district's databases for a model having an ability to recognize face recognition/analysis based on masked faces, and apply the new public safety model for the reported incident.

After implementing the public safety model improvement action associated with the artifact that is identified as the contributing factor for the incident prediction mismatch, the learning processor may check whether the public safety model improvement action performed has improved the ML Engine Analytics prediction of the incident. In some examples, such a public safety model improvement action or verification may apply to any or all cases where the task was, say, to recognize a criminal in a crowd of masked people, and check whether a prediction accuracy is higher after applying the improvement action according to (a), (b) or (c).

Use Case 2: Knife Recognition

In a given area/district of a city, a 911 incident is reported. Here, a man was stabbed with a knife, and a criminal (i.e., the assailant) was seen to throw away the knife. The ML Engine Analytics system, such as ML engine analytics system 164 of FIG. 3, receives a report related to the public safety emergency call that a criminal (stabber) was holding an unclassified item (i.e., the knife) and a request is made to the ML Engine Analytics system to find the knife thrown by the assailant. The ML Engine Analytics system identifies a public safety incident type (i.e., a knife attack) based on the received information and using a first public safety incident machine learning model based on the identified public safety incident type.

The ML Engine Analytics system accesses video footage of the area around the incident, to obtain real-time video footage thereof, in order to help the police officers to find the knife. However, the ML engine analytics system is unable to predict (or attempt to predict) a public safety incident therefrom and may inform the dispatcher (or police officer) that for that particular non-prediction scenario.

In accordance with an example, the learning processor (e.g., learning processor 320) obtains and compares the video, the prediction and details of the incident and identifies an artifact in the real-time video that is a contributing factor for the incident prediction mismatch, which in this case is the ability to predict and identify the knife. Artifact(s) of the video that may be causing the problem, e.g., sufficient detail on the specific knife (unknown item held by the assailant).

As a consequence, the learning processor implements or recommends a public safety model improvement action associated with the artifact that is identified as the contributing factor for the incident prediction mismatch. In this instance, the learning processor may recommend that the ML engine analytics system finds an alternative ML model and/or re-trains, e.g., where the alternative ML model is obtained from another agency that specifically recognizes knives.

After implementing the public safety model improvement action associated with the artifact that is identified as the contributing factor for the incident prediction mismatch, the learning processor may check whether the public safety model improvement action performed has improved the ML Engine Analytics prediction of the incident.

Use Case 3: Park Vandalism at Night

In a given area or district of a city, a 911 incident is reported. Here, a group of people were identified as demolishing park items (bushes, trees, pavements) and spraying graffiti on park items at night. The ML Engine Analytics system, such as ML engine analytics system 164 of FIG. 3, receives a report of the sprayed graffiti on park items, related to a public safety emergency call. The ML Engine Analytics system identifies a public safety incident type based on the received information and using a first public safety incident machine learning model based on the identified public safety incident type. The ML Engine Analytics system obtains a real-time video for a location of the public safety emergency call and predicts (or attempts to predict) a public safety incident therefrom. In this instance, ML Engine Analytics system is unable to output an accurate incident prediction, as the events were unrecognized. In this case, the events were unrecognized as the public safety model was trained only on videos recorded during daylight and during park opening hours.

In accordance with an example, the learning processor (e.g., learning processor 320) obtains and compares the public safety incident prediction with the information related to the public safety emergency call and identifies an incident prediction mismatch therefrom. Thereafter the learning processor determines what artifact(s) of the video may be a contributing factor for the incident prediction mismatch, e.g., insufficient detail and/or too many unrecognized events, leading to the determination that the public safety model is not appropriate for this situation. As a consequence, the learning processor implements or recommends a public safety model improvement action associated with the artifact that is identified as the contributing factor for the incident prediction mismatch, which in this case includes sourcing (or requesting a public safety model that includes), images for a park opened at night for the ML engine analytics system to use this alternative public safety ML model to be applied to the park where the incident was reported.

After implementing the public safety model improvement action associated with the artifact that is identified as the contributing factor for the incident prediction mismatch, the learning processor may check whether the public safety model improvement action performed has improved the public safety ML Engine Analytics prediction of the incident, for example following a re-training of the public safety ML model.

Use Case 4: Traffic Accident Involving a Child on a Scooter

In a given area or district of a city or county, a 911 traffic accident involving a child on a scooter is reported. The ML Engine Analytics system, such as ML engine analytics system 164 of FIG. 3, receives the report and identifies a public safety incident type, e.g., traffic accident, based on the received information and uses a first public safety incident machine learning model based on the identified public safety incident type. The ML Engine Analytics system identifies a real-time video for a location of the public safety emergency call (i.e., the traffic accident involving a scooter) and predicts a public safety incident therefrom. However, in this instance, the ML Engine Analytics system is unable to output an accurate incident prediction from obtained videos, as the events were unrecognized due to the involvement of young people. In this case, the events were unrecognized as the model was not trained (or currently optimized) for determining scooters or children involved in traffic accidents.

The learning processor obtains and compares the public safety incident prediction with the information related to the public safety emergency call and identifies an incident prediction mismatch therefrom. The learning processor then identifies an artifact in the real-time video that is a contributing factor for the incident prediction mismatch, which in this case is the fact that the model employed by the ML Engine Analytics system was not trained (or currently optimized) for determining scooters or children involved in traffic accidents. Thus, the learning processor recognizes that the video footage and the prediction model is a mismatch and that the ML engine analytics system needs to use an alternative ML model, e.g., one that uses scooters and/or children for example potentially a school setting where young people/children and scooters may be more appropriate. As a consequence, the learning processor implements or recommends a model improvement action associated with the artifact that is identified as the contributing factor for the incident prediction mismatch, which in this case is a model that involves scooters and children.

After implementing the model improvement action associated with the artifact that is identified as the contributing factor for the incident prediction mismatch, the learning processor may check whether the model improvement action performed has improved the ML Engine Analytics prediction of the public safety incident.

Herein, an image may include a plurality of sequential image frames, which together form a video captured by the video capture device, such as video capture device 108 in FIG. 1. Each image frame may be represented by a matrix of pixels, each pixel having a pixel image value. For example, the pixel image value may be a numerical value on grayscale (for example: '0' to '255') or a plurality of numerical values for colored images. Examples of color spaces used to represent pixel image values in image data may include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured public safety incident scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

Figure 8:
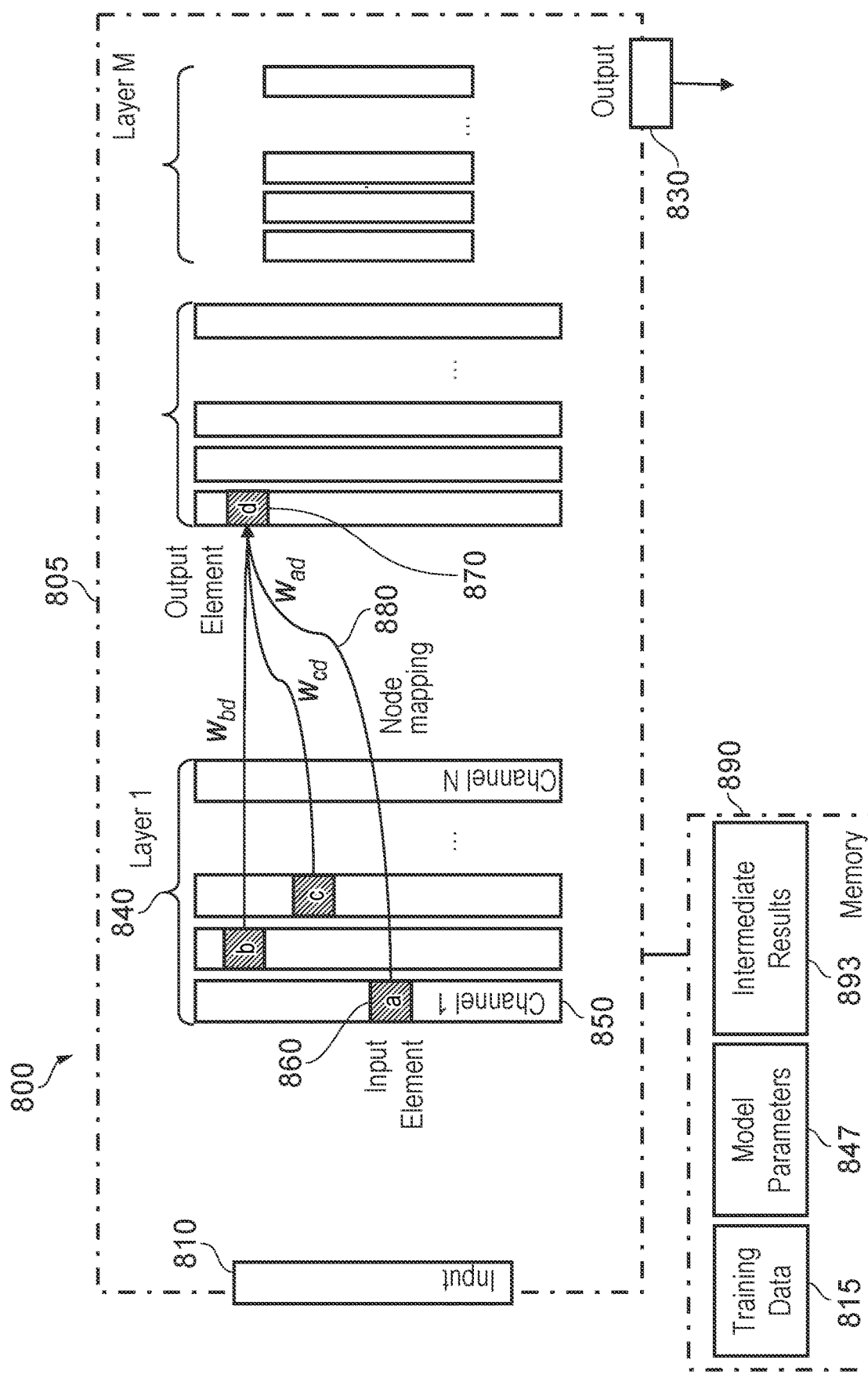
FIG. 8 illustrates an example of a neural network that may be employed as an artificial intelligence-based learning processor architecture for improved prediction of incidents in public safety systems according to some example embodiments.

Referring now to FIG. 8, an example of a neural network 800 that may be employed as a learning processor, such as an artificial intelligence (AI)-based learning processor, is described for improved prediction of incidents in public safety systems according to some examples of the present invention. In some examples, the example neural network 800 may comprise a convolutional neural network 800 that is arranged to apply a series of node mappings 880 to an input 810, which ultimately resolves into an output 830 consisting of one or more values, from which at least one of the values is used by the neural network 800. The example (convolutional) neural network 800 comprises a consecutive sequence of network layers (e.g., layers 840), each of which consists of a series of channels 850. The channels are further divided into input elements 860. In this example, each input element 860 may store a single value. Some (or all) input elements 860 in an earlier layer are connected to the elements in a later layer by node mappings 880, each with an associated weight. The collection of weights in the node mappings 880, together, form the neural network model parameters 847. For each node mapping 880, the elements in the earlier layer are referred to as input elements 860 and the elements in the output layer are referred to as the output elements 870. An element may be an input element to more than one node mapping, but an element is only ever the output of one node mapping 880.

In order to calculate the output 830 of the (convolutional) neural network 800, the system first considers the input layer as the earlier layer. The layer(s) to which the earlier layer is connected by a node mapping 880 is/are considered, in turn, as the later layer. The value for each element in later layers is calculated using the node mapping 880 in equation [1], where the values in the input elements 860 are multiplied by their associated weight in the node mapping 880 and summed together.

$$\text{Node mapping } \mathbf{880}: d = A(w_{ad} \times a + w_{bd} \times b + w_{cd} \times C) \quad [1]$$

The result of the summing operation is transformed by an activation function, 'A' and stored in the output element 870. The (convolutional) neural network 800 now treats the previously considered later layer(s) as the earlier layer, and the layers to which they are connected as the later layers. In this manner, the (convolutional) neural network 800 proceeds from the input layer 840 until the value(s) in the output 830 have been computed.

In examples of the invention, the (convolutional) neural network 800 may be trained. In some examples of the invention, the training of the convolutional neural network 800 may entail repeatedly presenting medical data as the input 810 of the (convolutional) neural network 800, in order to improve prediction of incidents in public safety systems. In some examples of the invention, an optimization algorithm may be used to reduce a loss function, for example by measuring how much each node mapping 880 weight contributed to the loss, and using this to modify the node mapping 880 in such a way as to reduce the loss. Each such modification is referred to as an iteration. After a sufficient number of iterations, the convolutional neural network 800 can be used to analyze the input video data for improved prediction of incidents in public safety systems.

In some examples of the invention, the large number of model parameters 847 used in the (convolutional) neural network 800 may require the device to include a memory 890. The memory 890 may be used to store the training data 815, the model parameters 847, and any intermediate results 893 of the node mappings.

Thus, in the learning processor 320, input data (e.g., a training dataset, clinical dataset, model parameters or intermediate results) is fed to the learning processor neuronal network in a format that fits the input matrix. Nodes are mapped in a specific way that is adapted to the purpose of the device (forming e.g., a convolutional neuronal network). The information is gradually reduced through a series of interconnected input/output elements to generate the final output.

In this manner, the learning processor receives information related to the public safety emergency call; identifies a public safety incident type based thereon; receives the prediction of the public safety incident where the prediction has used a first public safety incident machine learning model based on the identified public safety incident type and compares, e.g., iteratively, the public safety incident prediction with the information related to the public safety emergency call. The learning processor is then able to identify an incident prediction mismatch therefrom. In response to an identified incident prediction mismatch, the learning processor identifies an artifact in the real-time video that is a contributing factor for the incident prediction mismatch; and implements a model improvement action associated with the artifact.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for improving prediction of an incident affecting public safety, the method comprising, at a machine learning analytics system:
   obtaining a real-time video for a location of a public safety emergency call and predicting a public safety incident therefrom;
wherein the method further comprises, at a learning processor operably coupled to the machine learning analytics system:
   receiving information related to the public safety emergency call;
   identifying a public safety incident type based on the received information;
   receiving the prediction of the public safety incident from the machine learning analytics system;
   using a first public safety incident machine learning model based on the identified public safety incident type and comparing the public safety incident prediction with the information related to the public safety emergency call and identifying an incident prediction mismatch therefrom;
   identifying an artifact in the real-time video that is a contributing factor for the incident prediction mismatch; and
   implementing a model improvement action associated with the artifact that is identified as the contributing factor for the incident prediction mismatch.

2. The method for improving prediction of an incident affecting public safety according to claim 1, wherein implementing a model improvement action associated with the identified artifact comprises at least one of:
   re-training the first public safety incident machine learning model using a set of data associated with the information related to the public safety emergency call;
   using an alternative second public safety incident machine learning model for predicting based on the identified public safety incident type;
   obtaining a specialist video library for data associated with the information related to the public safety emergency call;
   obtaining a specialist video library for data associated with the identified artifact.

3. The method for improving prediction of an incident affecting public safety according to claim 2, wherein using an alternative second incident model for predicting based on the identified public safety incident type comprises obtaining at least one different public safety video related to the identified artifact for which prediction is low and check labels in those videos.

4. The method for improving prediction of an incident affecting public safety according to claim 1, wherein identifying the artifact in the real-time video that is a contributing factor for the incident prediction mismatch comprises identifying the artifact in the real-time video that is associated with a public safety incident type.

5. The method for improving prediction of an incident affecting public safety according to claim 4, wherein the artifact that is associated with a public safety incident type comprises one of: a masked assailant, an existence of an identified weapon, a potential weapon or a type of weapon, a known criminal.

6. The method for improving prediction of an incident affecting public safety according to claim 1 wherein obtaining a real-time video for a location of the public safety emergency call and predicting a public safety incident therefrom comprises the processor checking at least one label or a relationship between a plurality of labels associated with a video or incident.

7. The method for improving prediction of an incident affecting public safety according to claim 1 further comprising comparing the information related to the public safety emergency call with an improved public safety machine learning model following implementing the model improvement action associated with the artifact and identifying whether a second prediction is a better match than the incident prediction mismatch.

8. The method for improving prediction of an incident affecting public safety according to claim 1 wherein the information related to a public safety emergency call, comprises at least one of: a verbal description in the emergency call, a voice recording, a computer aided dispatch, CAD, task.

9. A public safety system arranged to provide improved prediction of an incident affecting public safety, the public safety system comprising:
   a machine learning analytics system configured to obtain a real-time video for a location of a public safety emergency call and predicting a public safety incident therefrom; and
   a learning processor operably coupled to the machine learning analytics system and configured to:
   receive information related to the public safety emergency call;
   identify a public safety incident type based on the received information;

receive the prediction of the public safety incident from the machine learning analytics system;

use a first public safety incident machine learning model based on the identified public safety incident type and comparing the public safety incident prediction with the information related to the public safety emergency call and identifying an incident prediction mismatch therefrom;

identify an artifact in the real-time video that is a contributing factor for the incident prediction mismatch; and implement a model improvement action associated with the artifact that is identified as the contributing factor for the incident prediction mismatch.

10. The public safety system according to claim 9, wherein the learning processor configured to implement a model improvement action associated with the identified artifact comprises the learning processor being configured to perform at least one of:

re-train the first public safety incident machine learning model using a set of data associated with the information related to the public safety emergency call;

use an alternative second public safety incident machine learning model for predicting based on the identified public safety incident type;

obtain a specialist video library for data associated with the information related to the public safety emergency call;

obtain a specialist video library for data associated with the identified artifact.

11. The public safety system according to claim 10, wherein the learning processor configured to use an alternative second incident model for predicting based on the identified public safety incident type comprises the learning processor configured to obtain at least one different public safety video related to the identified artifact for which prediction is low and check labels in those videos.

12. The public safety system according to claim 9, wherein the learning processor configured to identify the artifact in the real-time video that is a contributing factor for the incident prediction mismatch comprises the learning processor configured to identify the artifact in the real-time video that is associated with a public safety incident type.

13. The public safety system according to claim 12, wherein the artifact that is associated with a public safety incident type comprises one of: a masked assailant, an existence of an identified weapon, a potential weapon or a type of weapon, a known criminal.

14. The public safety system according to claim 9 wherein the learning processor being configured to obtain a real-time video for a location of the public safety emergency call and predict a public safety incident therefrom comprises the learning processor being configured to check at least one label or a relationship between a plurality of labels associated with a video or incident.

15. The public safety system according to claim 9 further comprising the learning processor being configured to compare the information related to the public safety emergency call with an improved public safety machine learning model following implementation of the model improvement action associated with the artifact and identify whether a second prediction is a better match than the incident prediction mismatch.

16. The public safety system according to claim 9 wherein the information related to a public safety emergency call, comprises at least one of: a verbal description in the emergency call, a voice recording, a computer aided dispatch, CAD, task.

17. A learning processor for a public safety system, the learning processor configured to:

receive information related to a public safety emergency call;

identify a public safety incident type based on the received information;

receive a prediction of a public safety incident from a machine learning analytics system that has obtained a real-time video for a location of the public safety emergency call and predicting a public safety incident therefrom;

use a first public safety incident machine learning model based on the identified public safety incident type and comparing the public safety incident prediction with the information related to the public safety emergency call and identifying an incident prediction mismatch therefrom;

identify an artifact in the real-time video that is a contributing factor for the incident prediction mismatch; and implement a model improvement action associated with the artifact that is identified as the contributing factor for the incident prediction mismatch.

18. The learning processor according to claim 17, wherein the learning processor configured to implement a model improvement action associated with the identified artifact comprises the learning processor being configured to perform at least one of:

re-train the first public safety incident machine learning model using a set of data associated with the information related to the public safety emergency call;

use an alternative second public safety incident machine learning model for predicting based on the identified public safety incident type;

obtain a specialist video library for data associated with the information related to the public safety emergency call;

obtain a specialist video library for data associated with the identified artifact.

19. The learning processor according to claim 18, wherein the learning processor is further configured to obtain at least one different public safety video related to the identified artifact for which prediction is low and check an identified at least one label in the at least one different public safety video.

20. The learning processor according to claim 17 further configured to identify the artifact in a real-time video that is associated with a public safety incident type as a contributing factor for the incident prediction mismatch.

* * * * *